US009618399B1

(12) United States Patent
Weninger et al.

(10) Patent No.: US 9,618,399 B1
(45) Date of Patent: Apr. 11, 2017

(54) FREQUENCY CORRECTION OF OSCILLATORS AND RELATED APPARATUS AND METHODS

(71) Applicant: Analog Devices, Inc., Norwood, MA (US)

(72) Inventors: Darren V. Weninger, Chandler, AZ (US); Bruce M. Newman, Gilbert, AZ (US)

(73) Assignee: Analog Devices, Inc., Norwood, MA (US)

( * ) Notice: Subject to any disclaimer, the term of this patent is extended or adjusted under 35 U.S.C. 154(b) by 680 days.

(21) Appl. No.: 14/026,123

(22) Filed: Sep. 13, 2013

Related U.S. Application Data

(60) Provisional application No. 61/706,046, filed on Sep. 26, 2012.

(51) Int. Cl.
*G01K 11/26* (2006.01)
(52) U.S. Cl.
CPC .................................. *G01K 11/26* (2013.01)
(58) Field of Classification Search
CPC ................ G01K 1/20; G01K 11/26
USPC ........................................................ 374/117
See application file for complete search history.

(56) References Cited

U.S. PATENT DOCUMENTS

| | | | | |
|---|---|---|---|---|
| 4,802,099 A * | 1/1989 | Logue | ................. | H01L 25/0657 257/467 |
| 4,960,109 A * | 10/1990 | Lele | ................. | A61N 7/02 374/E13.002 |
| 5,986,515 A * | 11/1999 | Sakurai | ................. | H03L 1/028 331/158 |
| 8,182,141 B1 * | 5/2012 | Collins | ................. | G01K 11/22 374/119 |
| 2003/0058057 A1 * | 3/2003 | Schmidt | ................. | H03L 1/025 331/175 |
| 2004/0012404 A1 * | 1/2004 | Feder | ................. | H01L 21/67248 324/750.07 |
| 2004/0076215 A1 * | 4/2004 | Baumbach | ................. | G01K 1/16 374/29 |
| 2005/0195050 A1 * | 9/2005 | Lutz | ................. | H03H 9/02338 333/186 |
| 2006/0027567 A1 * | 2/2006 | Biscotti | ................. | A23L 3/36 219/497 |
| 2006/0067377 A1 * | 3/2006 | Streicher | ................. | G01K 7/13 374/110 |
| 2006/0261703 A1 * | 11/2006 | Quevy | ................. | G01K 7/32 310/315 |
| 2006/0267703 A1 * | 11/2006 | Wang | ................. | H03L 1/026 331/176 |
| 2007/0188254 A1 * | 8/2007 | Sutardja | ................. | H01L 23/34 331/176 |
| 2008/0024119 A1 * | 1/2008 | Gualtieri | ................. | G01B 7/003 324/207.15 |

(Continued)

*Primary Examiner* — Lisa Caputo
*Assistant Examiner* — Philip Cotey
(74) *Attorney, Agent, or Firm* — Wolf, Greenfield & Sacks, P.C.

(57) ABSTRACT

Apparatus and methods are described for monitoring temperature of a mechanical resonator. Two or more temperature sensors may be positioned at respective locations to detect a temperature difference between the locations. The temperatures measured by the two or more temperature sensors may be used to determine a temperature of the mechanical resonator.

20 Claims, 4 Drawing Sheets

(56) References Cited

U.S. PATENT DOCUMENTS

| | | | | |
|---|---|---|---|---|
| 2008/0187025 A1* | 8/2008 | Coates | ............... | G01K 5/52 |
| | | | | 374/184 |
| 2008/0224786 A1* | 9/2008 | Stolpman | ............. | H03B 5/04 |
| | | | | 331/66 |
| 2009/0160569 A1* | 6/2009 | Gros | ................. | G04G 3/02 |
| | | | | 331/176 |
| 2009/0254256 A1* | 10/2009 | Dlugoss | .............. | F16H 59/68 |
| | | | | 701/60 |
| 2009/0278619 A1* | 11/2009 | Partridge | ............ | H03B 5/04 |
| | | | | 331/154 |
| 2010/0008394 A1* | 1/2010 | Miteva | ............... | G01K 11/20 |
| | | | | 374/1 |
| 2011/0076972 A1* | 3/2011 | Cooley | ............... | H03J 1/048 |
| | | | | 455/154.1 |
| 2011/0102091 A1* | 5/2011 | Yeric | ................. | G01K 7/32 |
| | | | | 331/57 |
| 2011/0133939 A1* | 6/2011 | Ranganathan | ...... | A61B 5/0008 |
| | | | | 340/584 |
| 2012/0306581 A1* | 12/2012 | Godager | ............. | E21B 47/06 |
| | | | | 331/56 |

* cited by examiner

FREQUENCY CORRECTION OF OSCILLATORS AND RELATED APPARATUS AND METHODS

RELATED APPLICATIONS

This Application claims the benefit under 35 U.S.C. §119(e) of U.S. Provisional Patent Application Ser. No. 61/706,046, filed on Sep. 26, 2012 and entitled "FREQUENCY CORRECTION OF OSCILLATORS AND RELATED APPARATUS AND METHODS", which is hereby incorporated herein by reference in its entirety.

BACKGROUND

Field

The technology described herein relates to frequency correction of oscillators and related apparatus and methods.

Related Art

Mechanical resonating structures typically exhibit temperature dependent behavior. As the temperature of the mechanical resonating structure changes, its resonance frequency changes. Conventionally, the temperature of the mechanical resonating structure cannot be measured directly. If temperature is measured at all, it is done at a point separate from the mechanical resonating structure but is treated as an approximation of the temperature of the mechanical resonating structure.

BRIEF SUMMARY

According to an aspect of the present technology, an apparatus is provided, comprising a mechanical resonating structure, an integrated circuit coupled to the mechanical resonating structure, a first temperature sensor disposed at a first position in the integrated circuit, and a second temperature sensor disposed at a second position in the integrated circuit.

According to an aspect of the present technology, a method is provided, comprising detecting a first temperature at a first location of an integrated circuit, detecting a second temperature at a second location of the integrated circuit, and applying a compensation signal to a mechanical resonating structure coupled to the integrated circuit based on the first temperature and the second temperature.

BRIEF DESCRIPTION OF DRAWINGS

Various aspects and embodiments of the technology will be described with reference to the following figures. It should be appreciated that the figures are not necessarily drawn to scale. Items appearing in multiple figures are indicated by the same reference number in all the figures in which they appear.

DETAILED DESCRIPTION

Figure 1:
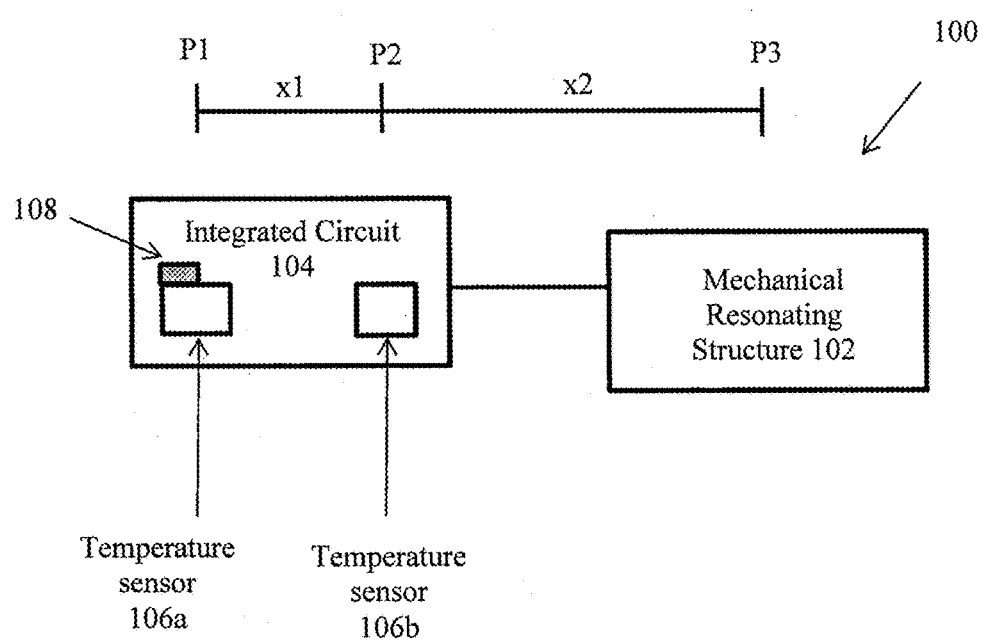
FIG. 1 illustrates a device comprising a mechanical resonating structure coupled to an integrated circuit including two or more temperature sensors, according to a non-limiting embodiment.

Applicants have appreciated that the temperature of a mechanical resonating structure may be determined by measuring the temperature at two or more locations separate from the mechanical resonating structure without the need to measure the temperature directly at the mechanical resonating structure. Compared to a setup in which temperature is measured at a single location separated from the mechanical resonating structure, measuring the temperature at two or more locations may enable more accurate determination of the temperature of the mechanical resonating structure. For example, a temperature difference between the temperatures measured at the two or more locations may be extrapolated to a point at which the mechanical resonating structure is located, thus providing an accurate measure of the temperature of the mechanical resonating structure. Thus, temperature fluctuations of the mechanical resonating structure may be accurately monitored and suitable control signals (e.g., a compensation signal) may be applied to the mechanical resonating structure.

Thus, according to an aspect of the technology, an apparatus is provided comprising a mechanical resonating structure, an integrated circuit coupled to the mechanical resonating structure, and two or more temperature sensors (e.g., two temperature sensors, three temperature sensors, four temperature sensors, etc.) disposed at respective positions in the integrated circuit. The integrated circuit may be suitable circuitry for driving and/or sensing operation of the mechanical resonating structure, in some non-limiting embodiments. The two or more temperature sensors may each detect a respective temperature corresponding to their respective positions. The temperatures detected by the two or more temperature sensors may be used to determine a temperature of the mechanical resonating structure, without the need to measure the temperature directly at the mechanical resonating structure. The determined temperature of the mechanical resonating structure may then be used to control operation of the mechanical resonating structure in any suitable manner, for example by applying a suitable drive signal, compensation signal, or in any other suitable manner.

According to another aspect of the technology, a method of determining the temperature of a mechanical resonating structure is provided comprising detecting two or more temperatures at respective locations of an integrated circuit coupled to a mechanical resonating structure. Based on the detected two or more temperatures, the temperature of the mechanical resonating structure may be determined, without the need to measure the temperature directly at the mechanical resonating structure. For example, according to a non-limiting embodiment, a temperature gradient between the respective locations of the two temperature sensors may be determined and extrapolated to a point at which the mechanical resonating structure is located. The determined temperature of the mechanical resonating structure may then be used to control operation of the mechanical resonating structure in any suitable manner, for example by applying a suitable drive signal, compensation signal, or in any other suitable manner.

The aspects described above, as well as additional aspects, are described further below. These aspects may be used individually, all together, or in any combination of two or more, as the technology is not limited in this respect.

According to an aspect of the present application, an apparatus comprises a mechanical resonating structure and two or more temperature sensors (e.g., two temperature sensors, three temperature sensors, four temperature sensors, etc.) disposed at respective locations not directly on the mechanical resonating structure. FIG. 1 illustrates a non-limiting embodiment according to this aspect, and illustrates a device 100 comprising a mechanical resonating structure 102 electrically coupled to an integrated circuit 104 including two temperature sensors 106a and 106b. Although two temperature sensors are shown, it should be appreciated that other embodiments may include more than two temperature sensors disposed at respective locations.

The mechanical resonating structure 102 may be any suitable mechanical resonating structure, as the various aspects described herein are not limited in this respect. For example, the mechanical resonating structure may be a microelectromechanical systems (MEMS) resonator, a Quartz crystal resonator, a piezoelectric resonator, or any other suitable mechanical resonating structure. Non-limiting examples are described below.

The integrated circuit 104 may be any suitable integrated circuit. For example, the integrated circuit 104 may be a drive circuit for driving operation of the mechanical resonating structure 102, may be a compensation circuit for applying a temperature signal to the mechanical resonating structure to compensate for temperature fluctuations of the mechanical resonating structure, may be a sensing circuit for sensing operation of the mechanical resonating structure, may be a combination of such circuits, or may be any other suitable type of circuit.

The mechanical resonating structure 102 and integrated circuit 104 may be coupled in any suitable manner and positioned relative to each other in any suitable manner. According to a non-limiting embodiment, the mechanical resonating structure 102 and integrated circuit 104 may be disposed on separate substrates (chips) or wafers, which may be bonded to each other (e.g., in a flip-chip orientation, or with one wafer serving as a cap for the other, as non-limiting examples) or which may be disposed in a side-by-side configuration (e.g., mounted a common board, as a non-limiting example). Alternatively, the mechanical resonating structure and integrated circuit may be fabricated on the same substrate, according to a non-limiting embodiment. Other configurations of the mechanical resonating structure 102 relative to the integrated circuit 104 are also possible.

The temperature sensors 106a and 106b may each detect temperature at a respective location. For purposes of explanation, the temperature sensor 106a may be at a position (or location or point) P1, the temperature sensor 106b may be at a position P2 and the mechanical resonating structure 102 may be at a position P3. The temperature at P3 may be related to the temperatures at P1 and P2, allowing for determination of the temperature at P3 (i.e., the temperature of the mechanical resonating structure 102) based on the measured temperatures at P1 and P2.

The relationship between the temperature at P3 (i.e., at the mechanical resonating structure 102) and the temperatures at P1 and P2 as measured by temperature sensors 106a and 106b may depend on various factors. For example, the temperature at P3 may depend on the distance between P1 and P2 (x1 in FIG. 1), the distance between P2 and P3 (x2 in FIG. 1), or a combination of the two, as non-limiting examples. As a non-limiting example, the temperature difference between P1 and P2 may be spatially linear, thus allowing for linear extrapolation over the distance x2 to determine the temperature at P3.

In practice, the relationship between the temperatures at P1, P2, and P3 may depend on various factors in addition to the distances between those locations. For example, if the temperature at one or more of the locations is varying, then the rate of variation may impact the relative temperature at the three locations. For example, if the temperatures at all three locations are increasing rapidly (e.g., due to rapid heating of the device 100), the difference in temperature at location P3 compared to P1 and P2 may be greater than if the temperatures at the three locations are only slowly increasing or if they are stable. Thus, rate of change of temperature may be factored into determination of the temperature at P3.

The types and configurations of materials of the device 100 may also impact the relative temperatures at P1, P2, and P3. For example, if the mechanical resonating structure and integrated circuit are bonded together and disposed within a package, the relative temperatures may be different than if the mechanical resonating structure and integrated circuit are in a side-by-side configuration, even if the distances between P1, P2, and P3 are the same in both scenarios.

Thus, according to an embodiment, the relative temperatures at P1, P2, and P3 may be initially calibrated upon fabrication of the device 100 by measuring the temperature at all three locations under a variety of conditions (e.g., high temperatures, low temperatures, varying temperatures, etc.). The resulting relationship may be used to generate a table representing the relative temperatures at the three locations, may be used to generate a formula representing the temperatures, or both. Thereafter, the table and/or formula may be used to determine the temperature at P3 based on the measured temperatures at P1 and P2. For instance, the table may be stored as a lookup table in the integrated circuit or in further processing circuitry coupled to the integrated circuit.

Other manners of determining the relationship between the temperatures at P1, P2, and P3 are also possible. For instance, a theoretical relationship of the temperatures at the three locations may be developed and used. The relationship may be linear or non-linear (e.g., matching an algebraic polynomial as a non-limiting example), as the various aspects described herein are not limited in this respect.

The temperature sensors 106a and 106b may be any suitable temperature sensors, as the aspects described herein are not limited to use with any particular type(s) of temperature sensors. The temperature sensors may be thermistors, temperature-dependent resistors, or any other suitable temperature sensors, and may be in discrete or integrated form.

The temperature sensors 106a and 106b may be positioned at any suitable locations relative to each other and relative to the mechanical resonating structure 102. According to an embodiment, it may be desired for one of the temperature sensors (e.g., temperature sensor 106a) to be positioned as close to a heat source (e.g., a heater of the device, an external or environmental heat source, or any other heat source) as possible, with the other temperature sensor (e.g., temperature sensor 106b) positioned as close to the mechanical resonating structure 102 as possible.

According to an embodiment, at least one of the temperature sensors is positioned near a ground pad of the integrated circuit 104 (e.g., ground pad 108). This may be done, for example, because ground pads tend to have good thermal conductivity. According to an embodiment, positioning a temperature sensor near a ground pad of the integrated circuit may be done when it is desired to position the temperature sensor as close to the heat source as possible. In some embodiments, a metal post may be provided from the integrated circuit 104 to the mechanical resonating structure 102 (e.g., providing an electrically conductive path between the two), and one of the temperature sensors may be positioned near the metal post.

Once the temperature of the mechanical resonating structure 102 is determined based on the temperature measurements made by temperature sensors 106a and 106b, any suitable action may be taken. For example, based on the temperature of the mechanical resonating structure, a control signal/drive signal may be applied to the mechanical resonating structure. A temperature compensation signal may be applied if appropriate (e.g., if the temperature at P3 is varying) to maintain desired operation of the mechanical resonating structure, for example by obtaining a value of the temperature compensation signal from a lookup table based on the determined temperature of the mechanical resonating structure. In some embodiments, a value of a suitable compensation signal may be determined using any of the techniques (methods and/or circuits) described in U.S. Patent Application Publication No. 2012/0013410 A1, published on Jan. 19, 2012, which is incorporated herein by reference in its entirety. Other actions are also possible.

Figure 2:
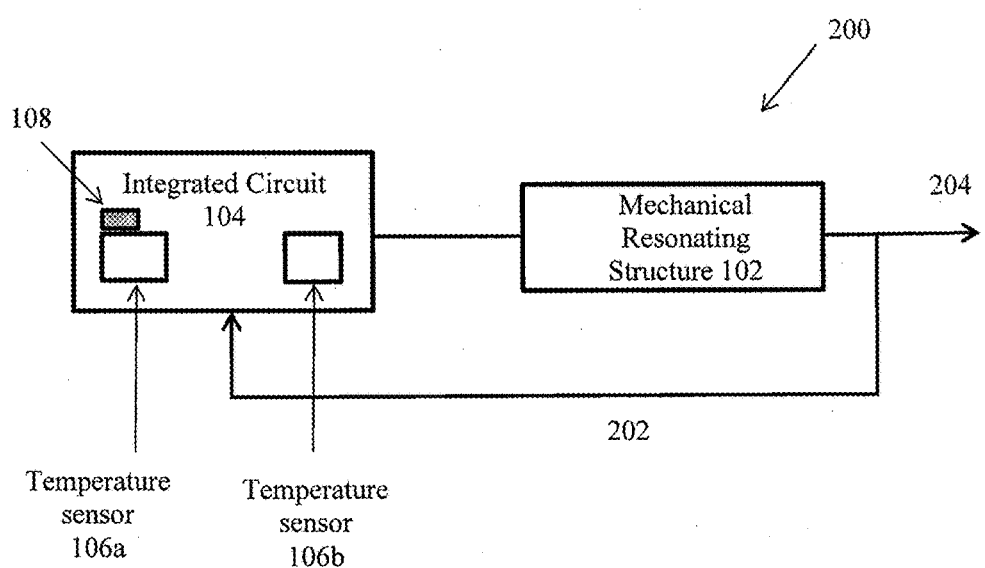
FIG. 2 illustrates an oscillator comprising a mechanical resonating structure and integrated circuitry including two or more temperature sensors, according to a non-limiting embodiment.

One type of device which may implement the embodiment of FIG. 1 is an oscillator. A non-limiting example is illustrated in FIG. 2. The oscillator 200 includes the components of the device 100 of FIG. 1. In addition, a feedback loop 202 is provided. The feedback loop may include any suitable circuitry for providing a suitable gain to ensure oscillation, including one or more amplifiers, as a non-limiting example. The oscillator 200 may be configured to provide an oscillating output signal 204 of any suitable frequency.

In the non-limiting example of FIG. 2, the integrated circuit 104 may be any type of integrated circuit previously described. According to a non-limiting embodiment, the integrated circuit 104 may be both a drive circuit and sensing circuit, and may also include temperature compensation circuitry. Other types of integrated circuits are also possible.

Figure 3:
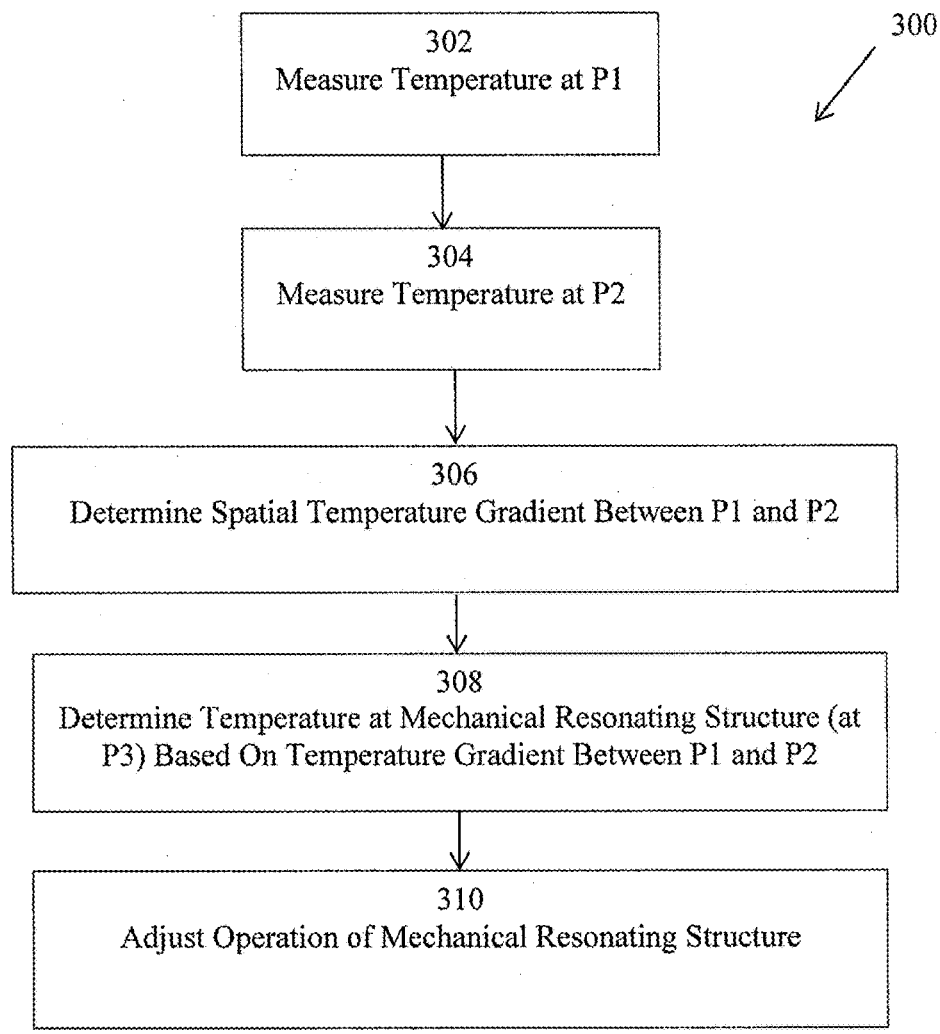
FIG. 3 is a flowchart of a process for controlling operation of a mechanical resonating structure based on temperatures measured at two or more locations, according to a non-limiting embodiment.

FIG. 3 illustrates a flowchart of a non-limiting method of operation of devices of the types illustrated in FIGS. 1 and 2. As shown, the method 300 begins at 302 with measuring a temperature at a first location P1 (e.g., using temperature sensor 106a) and a temperature at a second location P2 (e.g., using temperature sensor 106b) at 304. Although those measurements are shown as separate in the method of 300, it should be appreciated that they may be performed simultaneously or in any suitable order.

The spatial temperature gradient between P1 and P2 may be determined at 306. This may be accomplished in any of the manners previously described herein. Then, based on the spatial temperature gradient determined at 306, the temperature of the mechanical resonating structure at P3 may be determined at 308, for example using any of the techniques previously described herein. Optionally, the operation of the mechanical resonating structure may then be adjusted at 310 based on the determined temperature of the mechanical resonating structure. The illustrated method may be performed iteratively (e.g., returning from stage 310 to stage 302 and repeating the entire sequence one or more times) during operation of the device, and in some instances may be performed continuously.

The method 300 of FIG. 3 is a non-limiting example of a manner of operating the devices of FIGS. 1 and 2. Alternatives are possible. For example, the determination of the spatial temperature gradient between P1 and P2 at 306 may not be explicitly performed. Rather, as mentioned previously, according to an embodiment a lookup table may be provided relating the temperature at P3 to the measured temperatures at P1 and P2, without the need to explicitly determine the spatial temperature gradient between P1 and P2. Other alternatives are also possible.

Figure 4:
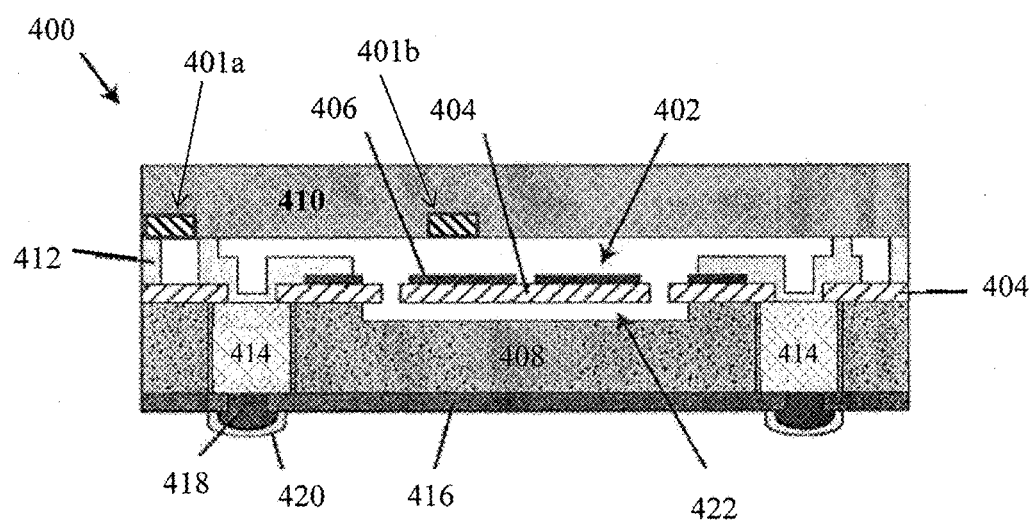
FIG. 4 is a cross-sectional view of a device comprising a mechanical resonating structure coupled to an integrated circuit including two or more temperature sensors, according to a non-limiting embodiment.

FIG. 4 illustrates a cross-sectional view of a non-limiting example of a device according to an embodiment of the present technology. As shown, the device 400 comprises a mechanical resonator 402 which may be formed of a piezoelectric material 404 and may include one or more electrodes 406. The piezoelectric material 404 may comprise quartz, single crystal quartz, or any other suitable piezoelectric material (e.g., aluminum nitride (AlN), zinc oxide (ZnO), cadmium sulfide (CdS), lead titanate ($PbTiO_3$), lead zirconate titanate (PZT), lithium niobate ($LiNbO_3$), lithium tantalate ($LiTaO_3$), potassium niobate ($KNbO_3$), $Li_2B_4O_7$, langasite ($La_3Ga_5SiO_{14}$), gallium arsenside (GaAs), barium sodium niobate, bismuth germanium oxide, indium arsenide, indium antimonide, or any other non-centrosymmetric material), either in substantially pure form or in combination with one or more additional materials. It may be integrated with a substrate 408, for example by bonding, or in any other suitable manner, for example to form an engineered substrate. In the non-limiting example of FIG. 4, the substrate 408 has a cavity 422 formed therein, above which the resonator 406 is suspended. However, other configurations are also possible, as the various aspects described herein are not limited to inclusion of cavities in substrates and/or using suspended piezoelectric material structures.

The mechanical resonator 402 may be any type of mechanical resonator, such as a quartz resonator, a plate acoustic wave resonator, a flexural mode resonator, a bulk acoustic wave (BAW) resonator, a surface acoustic wave (SAW) resonator, a film bulk acoustic resonator (FBAR), or any other suitable resonator, as the various aspects described herein are not limited in this respect. In some embodiments, the mechanical resonator may be formed of two or more materials, for example using two or more material layers. In some embodiments, the mechanical resonator may be a solidly mounted resonator (SMR), for example comprising a piezoelectric material bonded onto a stack of layers having alternating low and high acoustic impedances. Such a stack may be referred to as a mirror stack, and may be formed on a substrate.

The mechanical resonator may be actuated and/or detected in any suitable manner, including, but not limited to, being actuated and/or detected by piezoelectric techniques, electrostatic techniques, magnetic techniques, thermal techniques, piezoresistive techniques, any combination of those techniques listed, or in any other suitable manner.

In one embodiment, the mechanical resonator (and more particularly, an active layer of the mechanical resonator, such as a piezoelectric layer of a piezoelectric resonator) is configured (e.g., by suitable shaping, dimensioning, and arrangement of the components of the micromechanical resonating structure) to support Lamb waves when excited, e.g., when excited by an electric field applied across its thickness or in any other suitable direction. Lamb waves are one non-limiting example of a mode of operation which may be exhibited by mechanical resonators according to the aspects described herein. According to other embodiments, the mechanical resonator may be configured to operate in a contour mode, bulk mode, plate mode, flexural mode, any resonant mode of the following resonating structure shapes: any antenna type geometry; beams; cantilevers; free-free bridges; free-clamped bridges; clamped-clamped bridges;

discs; rings; prisms; cylinders; tubes; spheres; shells; springs; polygons; diaphragms; and tori; or any other suitable mode. In some embodiments, the mechanical resonator may be substantially planar and may be configured to exhibit in-plane vibration as opposed to out-of-plane vibration.

The substrate 408 may be a semiconductor substrate (e.g., silicon, SiC, etc.), or may comprise any other suitable material, either in substantially pure form or in combination with one or more additional materials. In some embodiments, the substrate 408 may comprise single crystal material. For example, the substrate 408 may be a single crystal silicon substrate.

The device 400 further comprises a cap 410. The cap 410 may facilitate formation of a hermetic seal (creating either an inert or non-inert environment) for the resonator 402, or may serve any other suitable purpose. For example, the cap may be bonded to the substrate and/or the piezoelectric material to form a vacuum environment for the mechanical resonator (e.g., by thermocompression, eutectic bond, or in any other suitable manner). However, not all hermetic seals necessarily result in creation of a vacuum environment. According to some non-limiting embodiments, circuitry (e.g., integrated circuitry (e.g., integrated circuit 104 of FIG. 1), such as CMOS circuitry, BiCMOS circuitry, bipolar circuitry, etc.) may be formed on the cap 410, which circuitry may be coupled to the resonator 402 (e.g., to the electrode 406 of the resonator 402) to communicate with the resonator 402. Thus, according to one non-limiting embodiment, the cap 410 may be a complementary metal oxide semiconductor (CMOS) cap, with integrated circuitry formed thereon. However, not all embodiments are limited in this respect, as, for example, in one embodiment the cap 410 may lack integrated circuitry (e.g., may be a "dummy cap"). Thus, in one embodiment, the device 400 may represent a capped MEMS device (e.g., a MEMS resonator) without integrated circuitry. In FIG. 4, the cap 410 is bonded to the substrate 408 and piezoelectric material 404 by a metallization layer 412. However, other manners of bonding the cap 410 to the other components of the device 400 may be utilized, and other types of bonding materials (e.g., other than metal) may be used.

In device 400, several components provide electrical access to the mechanical resonator 402. Access may be provided to circuitry on the substrate 408, circuitry on the cap 410 (if any, since in at least one embodiment the cap 410 may lack integrated circuitry), and/or circuitry external to the device 400. For example, in addition to providing bonding, the metallization layer 412 may also provide electrical connection to the resonator 402, and in particular to the electrode 406. The metallization layer 412 may therefore provide an electrical path to circuitry on substrate 408 and/or circuitry on cap 410 (e.g., integrated circuit 104). According to the non-limiting embodiment of FIG. 4, electrical connection to the resonator 402 is also provided from a backside of the substrate 408, by way of two thru-silicon vias 414 (TSV). The TSVs 414 may comprise doped silicon having any suitable doping concentration to make the silicon suitably conductive, doped polysilicon with any suitable doping concentration, copper, or any other suitable conductive material. Thus, electrical signals may be sent to/from the resonator 402 by way of the TSVs, and as such the TSVs may allow circuits external to the device 400 to communicate with the resonator 402. It should be appreciated that any number of such TSVs may be used (e.g., one, two, or many more than two) in those embodiments which utilize TSVs, and that not all embodiments include TSVs. According to some embodiments, the TSVs may function to communicate control and/or detection signals with the resonator 402. According to some embodiments, control and detection of the resonator may be substantially performed by circuits on the substrate 408 and/or cap 410, and only processed signals (e.g., output signals) may be sent external to the device 400 by the TSVs. Other communication schemes are also possible.

The device 400 illustrated in FIG. 4 further comprises additional layers 416, 418, and 420. Layer 416 may be an insulation layer (e.g., $SiO_2$), formed in any suitable manner (e.g., deposition or growth), and etched in any suitable manner for subsequent formation of layers 418 and 420. The layers 418 and 420 may represent under-bump metallization (UBM) to provide electrical access to the mechanical resonator and/or integrated circuitry of device 400 from the backside of the substrate 408, and thus may be formed of any suitable materials and in any suitable manner. For example, the layer 418 may be electroless plated nickel and the layer 420 may be electroless plated gold, although other materials and methods of formation are also possible.

It should be appreciated that the device 400 may take any suitable dimensions, and that the various aspects of the technology described herein are not limited to devices of any particular sizes. For example, in some non-limiting embodiments, the mechanical resonator 402 may have a large dimension (e.g., the largest of length, width, diameter, circumference, etc.) of less than approximately 1000 microns, less than 100 microns, less than 50 microns, or any other suitable value. It should be appreciated that other sizes are also possible.

The device 400 further comprises two temperature sensors, 401a and 401b. The temperatures sensors 401a and 401b may be any suitable types of temperature sensors, such as any of those previously described herein with respect to temperature sensors 106a and 106b or any other suitable temperature sensors. As shown, temperature sensor 401a is disposed proximate the metallization layer 412, while temperature sensor 401b is disposed closer to the mechanical resonator 402. They may operate in the manner previously described herein with respect to temperature sensors 106a and 106b, or in any other suitable manner.

As mentioned, in some embodiments more than two temperature sensors may be used. In such situations, any suitable temperature differences between temperatures detected by the temperature sensors may be calculated. For example, if three temperature sensors are used, a temperature difference between each of the temperature sensors may be calculated, between only the first and second temperature sensor and the second and third temperature sensor, or any other suitable temperature difference(s). Thus, in those embodiments in which more than two temperature sensors are used, the temperature difference(s) calculated is not limiting.

While multiple embodiments have been described in which two or more temperature sensors are placed in an integrated circuit coupled to a mechanical resonator, it should be appreciated that other configurations are possible. For example, one or more temperature sensors may be disposed in the integrated circuit and one or more temperature sensors may be disposed on or otherwise proximate to the mechanical resonator (for example, on a MEMS wafer on which the mechanical resonator is formed). In a further alternative, two or more temperature sensors may be disposed on a substrate (or other structure) on which a resonator is formed. In any of the above-described scenarios, any suitable combination of temperature sensor readings may be used to determine the temperature of the mechanical resonator.

As mentioned, when temperature measurements from two or more temperature sensors are used to determinate a temperature of a mechanical resonating structure (or other structure) at a location distinct from that of the temperature sensors, any suitable processing may be performed. In some embodiments, processing utilizing linear algorithms (or relationships) may be used. In some embodiments, polynomial algorithms (or relationships) may be used. Other algorithms are also possible.

The devices described herein may be used as stand-alone components, or may be incorporated into various types of larger devices. Thus, the various structures and methods described herein are not limited to being used in any particular environment or device. However, examples of devices which may incorporate one or more of the structures and/or methods described herein include, but are not limited to, tunable meters, mass sensors, gyroscopes, accelerometers, switches, and electromagnetic fuel sensors. According to some embodiments, the devices described are integrated in a timing oscillator. Timing oscillators are used in devices including digital clocks, radios, computers, oscilloscopes, signal generators, and cell phones, for example to provide precise clock signals to facilitate synchronization of other processes, such as receiving, processing, and/or transmitting signals. In some embodiments, one or more of the devices described herein may form part or all of a MEMS.

According to some embodiments, the mechanical resonating structures described herein comprise or are formed of multiple layers, making the structure a composite structure. For example, the mechanical resonating structure may comprise a base on which electrodes are formed, with the base and electrodes representing different layers. In some embodiments, the mechanical resonating structure may include a base which itself comprises one or more layers. In such embodiments, the layers of the base may differ in one or more of material, shape, and/or thickness.

The mechanical resonating structure may have any shape. For example, aspects of the technology may apply to mechanical resonating structures that are substantially rectangular, substantially ring-shaped, substantially disc-shaped, or that have any other suitable shape. Moreover, the mechanical resonating structure may have one or more beveled edges. According to some embodiments, the mechanical resonating structure may be substantially planar.

The mechanical resonating structures described herein may have any suitable dimensions. According to some embodiments, the mechanical resonating structure may have a substantially uniform thickness T, which in some embodiments is less than approximately two wavelengths of the resonance frequency of interest. In still other embodiments, the thickness T may be less than approximately one wavelength of the resonance frequency of interest (e.g., less than approximately one wavelength of a resonant Lamb wave supported by the mechanical resonating structure). The thickness may determine or depend on the types of waves supported by the mechanical resonating structure. For example, a given thickness may limit the ability of the mechanical resonating structure to support Lamb waves, or certain modes of Lamb waves. Thus, it should be appreciated that the thickness may be chosen in dependence on the types and/or modes of waves desired to be supported by the mechanical resonating structure. Thus, it should also be appreciated that thickness values other than those listed may be suitable for some applications, and that the various aspects described herein are not limited to using mechanical resonating structures having any particular thickness values.

The mechanical resonating structures may have any desired resonance frequencies and frequencies of operation, and may be configured to provide output signals of any desired frequencies. For example, the resonance frequencies and/or frequencies of operation of the mechanical resonating structures, and the frequencies of the output signals provided by the mechanical resonating structure, may be between 1 kHz and 10 GHz. In some embodiments, they may be in the upper MHz range (e.g., greater than 100 MHz), or at least 1 GHz (e.g., between 1 GHz and 10 GHz). In some embodiments, they may be at least 1 MHz (e.g., 13 MHz, 26 MHz) or, in some cases, at least 32 kHz. In some embodiments, they may be in the range of 30 to 35 kHz, 60 to 70 kHz, 10 MHz to 1 GHz, 1 GHz to 3 GHz, 3 GHz to 10 GHz, or any other suitable frequencies. Thus, it should be appreciated that the frequencies are not limiting.

The mechanical resonating structure may be actuated and/or detected in any suitable manner, with the particular type of actuation and/or detection depending on the type of mechanical resonating structure, the desired operating characteristics, or any other suitable criteria. For example, suitable actuation and/or detection techniques include, but are not limited to, piezoelectric techniques, electrostatic techniques, magnetic techniques, thermal techniques, piezoresistive techniques, any combination of those techniques listed, or any other suitable techniques. The various aspects of the technology described herein are not limited to the manner of actuation and/or detection.

According to some embodiments, the mechanical resonating structures described herein may be piezoelectric Lamb wave devices, such as piezoelectric Lamb wave resonators. Such Lamb wave devices may operate based on propagating acoustic waves, with the edges of the structure serving as reflectors for the waves. For such devices, the spacing between the plate edges may define the resonance cavity, and resonance may be achieved when the cavity is an integer multiple of p, where $p=\lambda/2$, with $\lambda$ being the acoustic wavelength of the Lamb wave of interest, understanding that the device may support more than one mode of Lamb waves. However, it should be appreciated that aspects of the technology described herein apply to other types of structures as well, and that Lamb wave structures are merely non-limiting examples.

Having thus described several aspects of at least one embodiment of the technology, it is to be appreciated that various alterations, modifications, and improvements will readily occur to those skilled in the art. Such alterations, modifications, and improvements are intended to be within the spirit and scope of the technology. Accordingly, the foregoing description and drawings provide non-limiting examples only.

What is claimed is:

1. An apparatus, comprising:
    a mechanical resonating structure;
    an integrated circuit coupled to the mechanical resonating structure;
    a first temperature sensor disposed at a first position in the integrated circuit;
    a second temperature sensor disposed at a second position in the integrated circuit; and
    processing circuitry configured to determine a third temperature at a third position at which the mechanical resonating structure is located by extrapolating temperatures measured by the first and second temperature sensors to the third position, wherein the third position is not a position in the integrated circuit.

2. The apparatus of claim 1, wherein the mechanical resonating structure is formed on a first substrate and wherein the integrated circuit is formed on a second substrate coupled to the first substrate.

3. The apparatus of claim 2, wherein the second substrate is configured as a cap for the mechanical resonating structure.

4. The apparatus of claim 1, wherein the processing circuitry is further configured to calculate a temperature difference representing a difference between a first temperature detected by the first temperature sensor and a second temperature detected by the second temperature sensor.

5. The apparatus of claim 1, wherein the processing circuitry is part of the integrated circuit.

6. The apparatus of claim 1, further comprising compensation circuitry coupled to the processing circuitry and configured to apply a compensation signal to the mechanical resonating structure in response to the processing circuitry determining the third temperature.

7. The apparatus of claim 6, wherein the compensation circuitry is part of the integrated circuit.

8. The apparatus of claim 1, wherein the processing circuitry is configured to implement an algebraic polynomial in determining the third temperature.

9. The apparatus of claim 1, further comprising a third temperature sensor disposed at a fourth position in the integrated circuit, wherein the processing circuitry is configured to receive temperature signals from the first, second, and third temperature sensors and calculate at least one temperature difference representing a difference between a first temperature detected by the first temperature sensor and a second temperature detected by the second temperature sensor.

10. The apparatus of claim 9, wherein the processing circuitry is further configured to calculate a temperature difference representing a difference between the second temperature detected by the second temperature sensor and a temperature detected by the third temperature sensor.

11. A method, comprising:
    detecting a first temperature at a first location of an integrated circuit;
    detecting a second temperature at a second location of the integrated circuit, the integrated circuit being coupled to a mechanical resonating structure located at a third location not within the integrated circuit;
    determining a third temperature at the third location, not within the integrated circuit, at which the mechanical resonating structure is located by extrapolating the first and second temperatures to the third location; and
    applying a compensation signal to the mechanical resonating structure based on the third temperature.

12. The method of claim 11, further comprising detecting a fourth temperature at a fourth location of the integrated circuit, wherein the extrapolating is performed further based on the fourth temperature.

13. The method of claim 11, wherein the extrapolating comprises performing a lookup operation in a lookup table.

14. The method of claim 11, wherein the extrapolating comprises determining a difference between the first temperature and the second temperature.

15. The method of claim 11, wherein the extrapolating comprises extrapolating a temperature gradient represented by a temperature difference across a distance separating the mechanical resonating structure from the second location.

16. An apparatus, comprising:
    a mechanical resonating structure on a device substrate;
    an integrated circuit substrate bonded to the device substrate and including an integrated circuit coupled to the mechanical resonating structure;
    a first temperature sensor disposed, on the integrated circuit substrate, at a first position in the integrated circuit;
    a second temperature sensor disposed, on the integrated circuit substrate, at a second position in the integrated circuit; and
    processing circuitry configured to determine a third temperature at a location on the device substrate of the mechanical resonating structure by extrapolating temperatures measured by the first and second temperature sensors to the location of the mechanical resonating structure.

17. The apparatus of claim 16, further comprising compensation circuitry coupled to the processing circuitry and configured to apply a compensation signal to the mechanical resonating structure in response to the processing circuitry determining the third temperature.

18. The apparatus of claim 17, wherein the compensation circuitry is part of the integrated circuit.

19. The apparatus of claim 16, wherein the processing circuitry is configured to perform the extrapolating at least in part by extrapolating a temperature gradient represented by a temperature difference across a distance separating the mechanical resonating structure from the second position.

20. The apparatus of claim 16, further comprising a third temperature sensor disposed at a third position on the integrated circuit substrate, wherein the processing circuitry is configured to determine the third temperature further based on a temperature measured by the third temperature sensor.

* * * * *